May 22, 1956   J. H. WIGGINS   2,746,483
VENT VALVE FOR GAS AND/OR LIQUID STORAGE CONTAINER
Filed Dec. 27, 1952   2 Sheets-Sheet 1
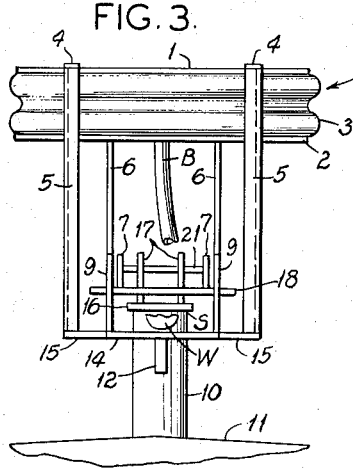
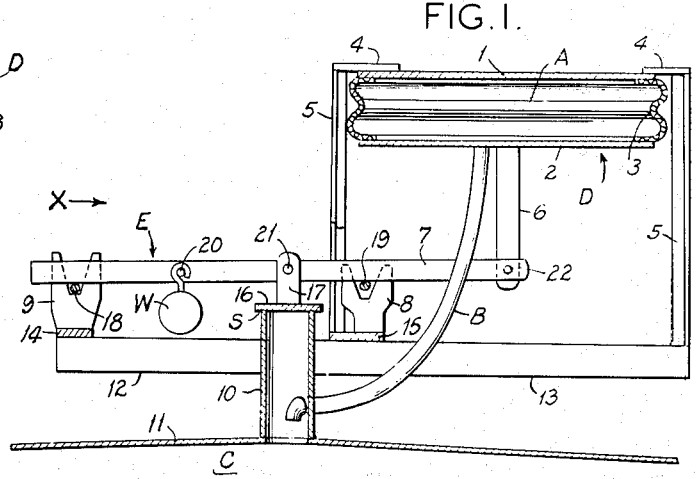
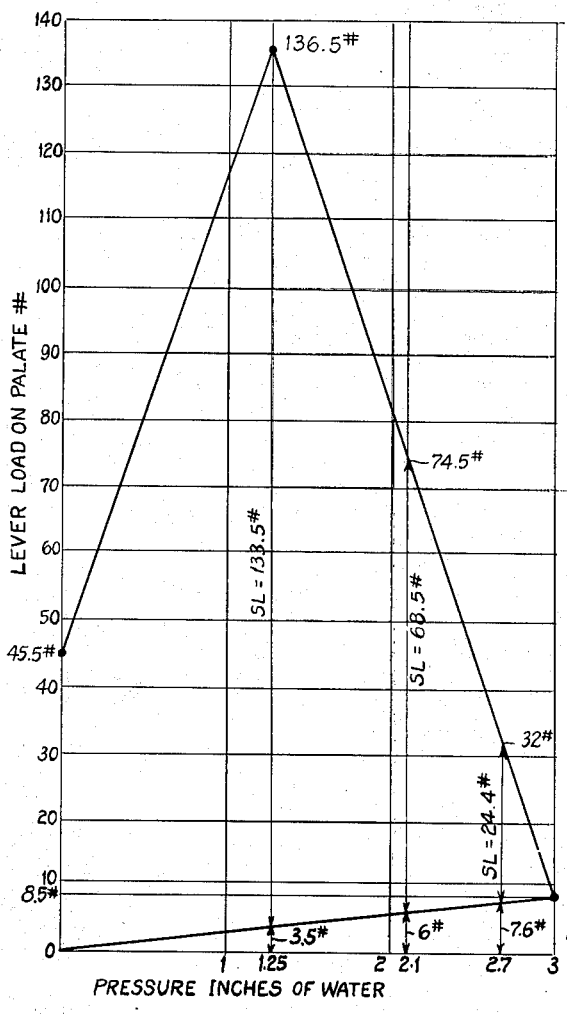
INVENTOR,
JOHN H. WIGGINS,
BY Kello R. Church
ATTORNEY.

INVENTOR,
JOHN H. WIGGINS.
BY Nell R. Church
ATTORNEY.

United States Patent Office 2,746,483
Patented May 22, 1956

2,746,483

VENT VALVE FOR GAS AND/OR LIQUID STORAGE CONTAINER

John H. Wiggins, Chicago, Ill.

Application December 27, 1952, Serial No. 328,164

2 Claims. (Cl. 137—493)

This invention relates to vent valves and relief valves of the kind that are used to provide pressure relief and/or vacuum relief for containers used to store gases and/or volatile liquids. In my U. S. Patent #2,295,767 dated September 15, 1942, I have illustrated a vent valve of the type above referred to which consists of a unitary structure comprising a gas chamber that is in direct communication at all times with the gas or vapor space of the container which is to be vented, a palate or valve element for venting said gas space which palate is normally closed or seated, and an operating mechanism for said valve element constructed in such a manner as to obtain the following results, (a) tight seating of said valve element while the internal pressure of the gas or vapor space of the container is building up to a certain approximate predetermined pressure, (b) automatic opening of said valve element to provide pressure relief when said approximate positive pressure is reached, and (c) automatic opening of said valve element to provide vacuum relief when a minus pressure is created in the gas or vapor space of the container.

The vent valve herein illustrated which constitutes the subject matter of my present application, embodies all of the desirable features and characteristics of the valve disclosed in my said patent but it is an improvement on said valve in that the operating mechanism for the valve element or valve palate is constructed in a novel manner that increases the efficiency and adds to the utility of the valve. Briefly described, my improved valve comprises a palate or valve element that normally seals a vent leading from a container in which a gas or volatile liquid is confined, a gas chamber which is always in direct communication with the vapor space of said container, a diaphragm or equivalent actuating member arranged so that positive pressure in said gas chamber causes said diaphragm to move in one direction and a minus pressure in said chamber causes said diaphragm to move in the opposite direction, and a two-way lever for transmitting movement from said diaphragm to said valve palate, constructed and arranged so that when pressure is building up in the gas chamber said lever will coact with said diaphragm to constitute a load which enhances the seating action of the valve palate, that when the pressure in said gas chamber rises above a predetermined degree the lever will move the palate into its wide open position, thereby venting the container for pressure relief, and when a minus pressure is created in the gas chamber said lever will move the valve palate into its wide open position so as to admit air or some other gas to the container to provide vacuum relief.

Fig. 1 of the drawings is a longitudinal sectional view of my improved valve taken on the line 1—1 of Fig. 2, partly broken away so as to more clearly illustrate the construction of the parts that form the gas chamber of the valve.

Fig. 3 is an end elevational view looking in the direction indicated by the arrow X in Fig. 1.

Fig. 7 is a curve showing the loadings of the valve element or palate.

Figure 2:
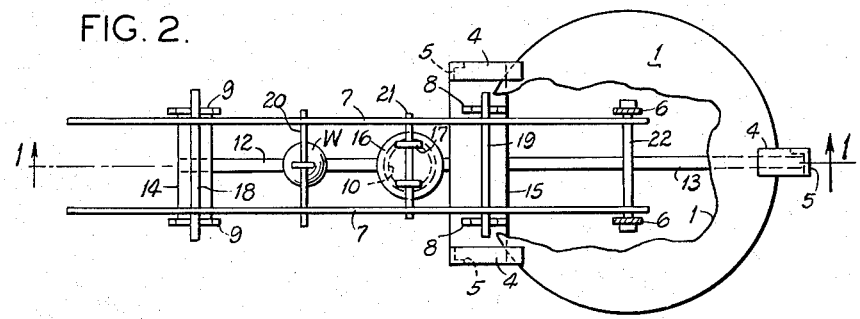
Fig. 2 is a top plan view with the top and bottom plates of the gas chamber broken away.

In Figs. 1 and 3 of the drawings the reference character C designates the gas or vapor space of a container 11 in which gases and/or volatile liquids are stored, the top portion of said container being provided with a vent pipe 10 through which gas can escape from the vapor space C to provide pressure relief for the container and through which air or some other gas is admitted to the vapor space C to provide vacuum relief for the container 11. The upper end of said vent 10 constitutes a seat S for a valve element or palate 16 that normally rests upon said seat so as to cut off communication between the atmosphere and the interior of the container 11. My improved valve structure comprises a gas chamber A which at all times is maintained in direct communication with the gas or vapor space C of the container, as for example by means of a flexible pipe or hose B shown in Fig. 1, a diaphragm D that moves in one direction when positive pressure is created in the gas chamber A and moves in the opposite direction when a minus pressure is created in said chamber A, and a two way lever, designated as an entirety by the reference character E, which is of such construction and arrangement that it coacts with the diaphragm D to hold the valve palate 16 tightly seated when pressure in the container 11 is building up, transmits movement from said diaphragm to the palate 16 to open said palate when the container 11 requires pressure relief and transmits movement from said diaphragm to the palate 16 to open said palate to admit air or the like to the container 11 when said container requires vacuum relief. The above mentioned pressure operated diaphragm D and two-way lever E can be constructed in various ways without departing from the spirit of my invention. Preferably the diaphragm D consists of a horizontally disposed, vertically movable plate 2 that forms the bottom wall of the gas chamber A as shown in Fig. 1. The top wall of said chamber is formed by a stationary horizontally disposed plate 1 arranged in superimposed relation with the vertically movable bottom plate 2 and said two plates are joined together in a gas tight manner by a fabric seal 3, thereby forming a bellows like structure having one wall (the diaphragm D) that moves downwardly when said structure expands due to an increase in the internal pressure of chamber A and which moves upwardly when said structure contracts due to gas being sucked out of chamber A by a vacuum or partial vacuum created in the gas or vapor space C of the container 11. The stationary top wall 1 of the gas chamber A is herein illustrated as being supported by four uprights 5 that are mounted stationary in any suitable way on a horizontal supporting bar 13 rigidly attached to and projecting laterally from the vent pipe 10 on the container 11, said uprights 5 being provided at their upper ends with brackets 4 to which the top wall 1 is rigidly attached.

The two way lever E is fulcrumed in a novel manner that causes said lever to coact with the diaphragm D to, (a) exert pressure on the valve palate 16 in a direction to enhance the seating action of same, when pressure in the gas chamber is building up, (b) exert an upward pull on said valve palate and move it into its wide open position to provide pressure relief for the container 11 when the pressure in said chamber A exceeds a predetermined degree, and (c) exert an upward pull on the valve palate 16 and move it into its wide open position to provide vacuum relief for the container, when a minus pressure is created in the gas chamber A. In the form of my invention herein illustrated the lever E is formed by two parallel bars 7 arranged in spaced relation and rigidly joined together by transversely disposed tie members. Said lever is mounted on the valve palate 16 and is pivotally connected to same by a pintle pin 21 carried by upwardly projecting lugs 17 on the top side of the valve palate as shown in Fig. 1. The right hand end of said lever is pivotally connected by a pintle pin 22 to downwardly projecting shanks or extensions 6 on the underside of the diaphragm D and a weight W is suspended from said lever by a supporting pin or rod 20 located a certain distance to the left of the pintle pin 21 that pivotally connects the lever E to the valve palate 16. At a point to the right of said center pintle 21, I provide a stationary fulcrum $F^1$ on which said lever is adapted to rock and raise the valve palate from its seat S to provide pressure relief, and at a point to the left of the weight W I provide a stationary fulcrum $F^2$ on which the lever E is adapted to rock and raise the valve palate from its seat to provide vacuum relief as hereinafter described. The fulcrum $F^1$ is formed by two notched lugs 8 carried by and projecting upwardly from a horizontally disposed plate 15 which in turn is stationarily mounted on the previously mentioned horizontally disposed support 13 carried by and projecting laterally from the vent pipe 10 on the container, and the fulcrum $F^2$ is of similar construction and is formed by a pair of notched lugs 9 carried by and projecting upwardly from a horizontally disposed plate 14 carried by a horizontally disposed support 12 rigidly attached to and projecting laterally, to the left, from the vent pipe 10. A pintle or pivot pin 19 that is attached to the lever E coacts with the fulcrum lugs 8 to constitute the previously mentioned fulcrum $F^1$, and a pintle pin or pivot 18 on said lever coacts with the fulcrum lugs 9 to constitute the fulcrum $F^2$, said pintles or pivot pins 18 and 19 also serving as tie members which join together the two parallel bars that constitute the lever E. The lugs 17 on the valve palate and the pintle pin 21 in said lugs, form in effect a pivoted link between the lever E and the valve palate 16 which pulls said palate upwardly off its seat when said lever moves to vent the gas space C of the container for pressure relief and for vacuum relief. They also serve as a bearing member on the palate on which the lever E normally exerts pressure in a direction to seat the palate, and at the period in the cycle of operations of said lever when the load of the lever is being transferred from the valve palate onto the fulcrum $F^1$, the pintle pin 21 serves as a fulcrum on which the lever rocks. Accordingly, the lugs 17 and pintle pin 21 can properly be referred to as a third fulcrum $F^3$ of the lever.

Figure 4:
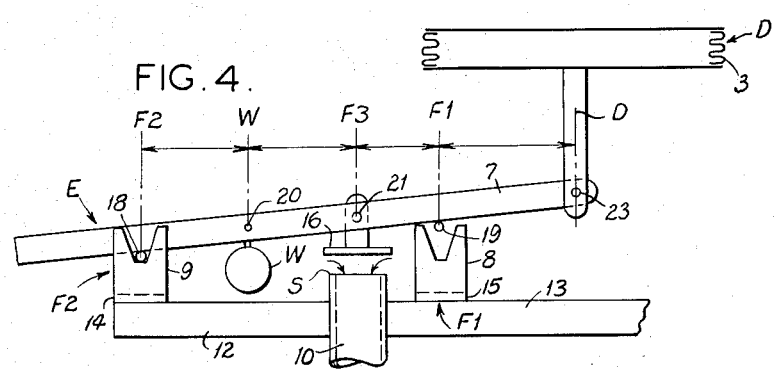
Fig. 4 is a front elevational view with certain parts removed for greater clarity, illustrating the position of the coacting parts of the structure when the valve is venting to provide vacuum relief.
Figure 5:
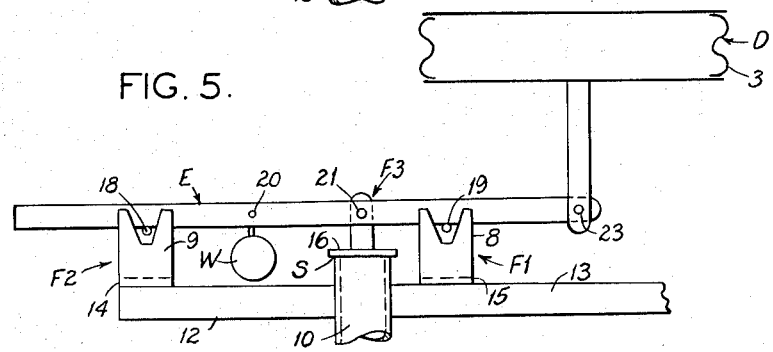
Fig. 5 is a view similar to Fig. 4 illustrating the position of the parts of the structure when the valve element or palate is seated and the pressure in the gas chamber is building up.
Figure 6:
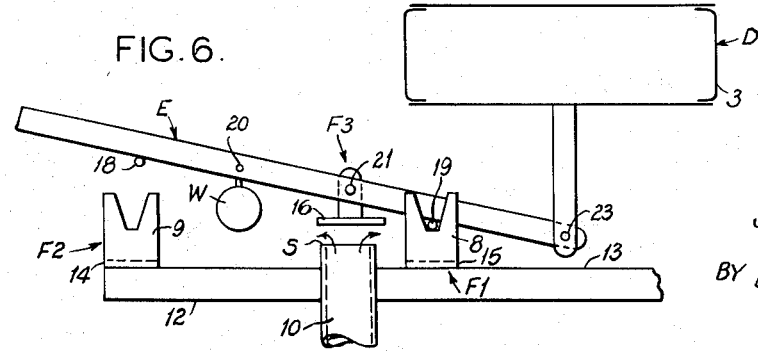
Fig. 6 is a view similar to Fig. 4, showing the valve venting to provide pressure relief.

Fig. 7 of the drawings and subsequent portions of the specification give complete data for designing a valve intended for use on an oil storage container or tank and having a venting pressure of 3″ $H_2O$. Fig. 1 illustrates the position of the coacting parts of the valve when the container is at zero pressure. As such times the lever E rests heavily on the left hand fulcrum $F^2$, formed by the pin 18 and lugs 9, and on the center fulcrum $F^3$, formed by the pin 21 and lugs 17, thus holding the palate 16 tightly on its seat S, the load on the center fulcrum $F^3$ being 45.5# as indicated in Fig. 7. As pressure builds up in the container, the pressure in gas chamber A increases thereby causing the diaphragm D to impose an additional load on the lever E in a direction tending to reduce the load of the lever on the fulcrum $F^2$ and increase the load of said lever on the valve palate. The result of this action is that the seating action of the valve palate is enhanced as the pressure in the vapor space of the container increases, due to the fact that at this period in the cycle of operations the valve palate is subjected to a downward force or load created by the weight of the lever E, the mass or load of the weight W on said lever and the downward thrust exerted on the right hand end of the lever E by the pressure operated diaphragm D. This downward force or load continues until the load or force created by the diaphragm on the lever just balances the load of the weight W, which balance in the valve herein described, is designed to occur at 1.25″ $H_2O$. Now just as the pressure equals 1.25″ $H_2O$ the load on fulcrum $F^2$ has reached zero and the load on the palate has reached 136.5# (see Fig. 7). The result is that the very slightest further increase in pressure causes the lever E to rock or tilt on the center fulcrum $F^3$ (the pin 21 in the lugs 17 on the palate) sufficiently to disengage the lever from the fulcrum $F^2$ and engage it with the fulcrum $F^1$, the pressure of the lever on $F^1$ being very slight. As the pressure of the gas chamber A keeps on increasing, the load created on the lever by the diaphragm D increases, the pressure of the lever on fulcrum $F^1$ increases and the lever load on the center fulcrum $F^3$ and on the valve palate decreases as shown in Fig. 7. When the pressure equals 3″ $H_2O$, the load created by the diaphragm is so great that the lever load on the palate becomes zero whereupon the palate starts to open as shown in Fig. 6 and provide pressure relief for the vapor space of the container. The action of the valve in providing vacuum relief for the container is as follows. When the vapor space of the container is at zero pressure, the lever E is resting on the fulcrums $F^2$ and $F^3$. As a minus pressure occurs in the gas chamber A, the diaphragm D starts to try to move upwardly and lift the right hand end of the lever E and hence the palate 16. This causes the lever load on the palate to decrease and the load on the fulcrum $F^2$ to increase until at −0.62″ $H_2O$ the lift of the lever on the palate is sufficient to raise it at which point air flows downwardly through the vent 10 as shown in Fig. 4 to provide vacuum relief for the container. From the foregoing it will be seen that in my improved valve the vacuum in gas chamber A decreases until the valve palate contacts its seat S. The vacuum decreases to zero and pressure builds up until just before the load imposed on the right hand end of lever E by diaphragm D balances weight W. Thus in the above pressure range the lever, fulcrums and seat are held in position shown in Fig. 1. Then as pressure increases further the lever is balanced on the palate and seat as a fulcrum (Fig. 5). Further very slight increase in pressure causes the pin 19 of fulcrum $F^1$ to descend and rest in the notches in lugs 8. The lever E remains in this position until the pressure in chamber A forces the diaphragm D downward, said lever rotating about fulcrum $F^1$ and thus moving the palate into its open position as shown in Fig. 6 to provide pressure relief for the vapor space of the container. At 1″ $H_2O$ pressure in excess of the 3″ $H_2O$ designed pressure, my valve will have a breakaway pull of 72#. Also it is designed to open under vacuum at about 0.6″ $H_2O$. At −1.6″ $H_2O$ the breakaway pull is 72#. Because of low "blow down" characteristics, my valve will stand full open at about 3.2″ $H_2O$ pressure or a blow down of only 0.2″ $H_2O$.

Various spacings of the weight W and the three fulcrums $F^1$, $F^2$ and $F^3$ can be used. In the structure shown the distance from the right hand end of lever E to fulcrum $F^1$ is two units of length; the distance from $F^1$ to $F^3$ is one unit; the distance for $F^3$ to weight W is one and one-half units, and the distance from W to $F^2$ is one and one-half units. For a valve structure intended to be used on oil storage tanks and having a venting pressure of 3″ $H_2O$, the spacings are as shown in Figs. 4, 5 and 6, when the structure is equipped with a diaphragm of about 3′ in diameter (7 sq. ft. effective area) and a valve seat having a diameter of 10" or 0.545 sq. ft. In order to determine the size of the weight W and the load of the lever E on the valve palate 16 for various pressures in the gas chamber A, the following examples are given:

In said examples abbreviations are used as follows:

$F^1$—fulcrum of lever E for pressure relief.
$F^2$—fulcrum of lever E for vacuum relief.
$F^3$—fulcrum of lever E for normal pressure.
D—diaphragm.
PLG—load on palate due to gas pressure in container 11.
PLL—load imposed on palate by lever E.
DW—load imposed on right hand end of lever E by diaphragm includes dead load plus live load, i. e., weight of diaphragm plus load imposed on diaphragm by gas in chamber A.
S—seat for valve palate.
SL—load imposed on seat S by palate 16 equals PLL—PLG.

For sake of simplicity the weight of the diaphragm D, of the valve palate 16 and of the lever E, are not considered.

FOR PRESSURE

W: (moments about $F^1$) 2½W equals 1×PLG plus 2DW; DW for 3" H₂O equals 7 sq. ft.×5.2#/sq. ft.×3" equals 109#; PLG equals 0.545 sq. ft.×15.6# equals 8.5# equals gas pressure load against the palate. Therefore, 2½W equals 8.5# plus 218# equals 226.5#; W equals 91#

What is the load PLL of the lever against the palate at zero pressure in C?

(Moments about $F^2$) 3PLL equals 1½W plus 6DW (but DW equals 0) equals 136.5#; PLL equals 45.5#. Thus the lever pressure on the palate at zero pressure is 45.5#.

At what pressure does lever balance at the seat as a fulcrum?

(Moments about S) 1½W equals 3DW equals 136.5# (DW equals 45.5#) thus the load caused by D to balance W is 45.5#. The pressure in the container and in chamber A to give 45.5# load on 2, is 45.5#/7 sq. ft. or 6.5#/sq. ft. or 1.25" H₂O.

Next, what is the load PLL of the lever on the palate when the lever is balanced on the seat S and the container pressure is 1.25" H₂O?

Since the loads are balanced, the lever load PLL is W plus DW at 1.25" H₂O or 91# plus 45.5# or 136.5#.

See Fig. 7. Thus from zero pressure to 1.25" H₂O pressure the lever load on the palate has increased from 45.5# to 136.5#. The latter is the greatest lever load PLL since at this point the lever rotates so that the pintle 19 becomes the fulcrum and as the load DW increases further, the lever load gradually decreases. The lever load on the palate being greatest when the pressure has increased, a large percentage of the venting pressure makes the curve of the decreasing lever load PLL very steep which insures large loads of the palate on the seat S within the working range of the valve.

Now as the container pressure increases, the load of the gases PLG on the underside of the palate increases thus decreasing the load SL of the palate on the seat. See Fig. 7. Thus at any given pressure the load SL which is the load we are concerned with, is *PLL—PLG*. See the following table:

Table

| "H₂O Press. | Percent of Total Press. | PLG# | PLL# | SL# |
|---|---|---|---|---|
| 0 | 0 | 0 | 45.5 | 45.5 |
| 1.25 | 42 | 3.5 | 136.5 | 133.5 |
| 2.1 | 70 | 6.0 | 74.5 | 68.5 |
| 2.7 | 90 | 7.6 | 32.0 | 24.4 |
| 2.9 | 96.5 | 8.2 | 17.0 | 8.8 |

FOR VACUUM

When a sufficient partial vacuum occurs in chamber A the diaphragm will rise, the lever rotating about $F^2$.

At what differential does the valve palate open under vacuum?

Take moments about $F^2$: DW×6 equals W×1½; W equals 91#. Therefore, DW equals 22.7# lift up when the palate is ready to rise and open the valve. The differential pressure is then 22.7#/area of D equals 22.7#/7 sq. ft., equals 3.22#/sq. ft. or 0.62" H₂O. Now if the plate 2 weighs 15#, this would add 2.1#/sq. ft. or 0.41" H₂O and the venting differential pressure would be −1.03" H₂O.

When the valve palate opens for either vacuum or pressure relief the diaphragm is doing practically all the work. In the case of vacuum relief the diaphragm does all the work and therefore after the valve starts to open, the suction on the seat decreases and the palate moves immediately to full open which is a very desirable feature since vacuum on a gas or liquid container is its greater hazard. The vacuum will decrease very slightly when the valve closes.

In the case of pressure relief part of the lift from the the gas pressure PLG on the seat is lost when the palate opens. Therefore, the container pressure must increase very slightly before the palate is full open. Since the diaphragm D is so much larger than the seat area (about 13 times), the above pressure increase is very slight—about 0.2" H₂O or 6.7% of the designed pressure of 3". I wish to point out that if the weight W is placed at the left to fulcrum $F^2$, then said weight acts to counterweight part of the weight of the diaphragm D and its attachments. This results in a lower differential pressure for vacuum venting. It also gives a more efficient curve for the load of the valve palate on its seat.

From the foregoing it will be seen that my improved valve structure has the following features or characteristics that distinguish it from and make it an improvement on conventional vent valves that have heretofore been used on gas and oil storage tanks, or which are shown in the prior art; (a) it comprises a two way lever that is combined with a diaphragm which is moved by the gas pressure in the space to be vented, so as to vent said space for both pressure and vacuum relief with a single valve element or valve palate that is operated by said lever; (b) said valve palate moves in the same direction to vent said space for both pressure and vacuum relief, and the venting pressure can be accurately controlled or governed by a change in the position of a weight which balances the load exerted by the gas pressure on the two way lever that actuates the valve palate; and (c) the means which constitutes a load which holds the valve palate seated is of such design or construction that the seating load increases to a certain point of pressure and thence decreases to zero at the designed opening pressure of the valve palate.

While my improved valve structure is designed primarily for venting the gas space of low pressure (1" to 10" H₂O) gas and oil storage tanks that also require venting under vacuum at a very small amount below atmosphere (about 1" H₂O) to keep them from collapsing, it is also adapted for use with high pressure (2#/sq. in. and up) tanks or vessels in which various kinds of gases and volatile liquids are stored.

Having thus described my invention, what I claim as new and desire to secure by Letters Patent is:

1. The combination of a container adapted to hold gases and/or volatile liquids, a combined pressure relief and vacuum relief valve mounted on said container, said valve having a seat and a palate, and an operating mechanism for said palate comprising a gas chamber in direct communication with the vapor space of the container, said gas chamber having an actuating part that moves in one direction in response to a positive pressure in said gas chamber and moves in the opposite direction in response to a minus pressure in said gas chamber, a lever pivotally attached to said actuating part and mounted intermediate its ends on said palate, said operating mechanism also comprising a first fulcrum for said lever located between said palate and the pivotal attachment of the lever to said actuating part and a second fulcrum for said lever located on the side of said palate opposite to said pivotal attachment, pressure in the container causing the lever to rock about said first fulcrum and open the valve palate to provide pressure relief for the container and a partial vacuum in said container causing the lever to rock about said second fulcrum and open the palate to provide vacuum relief for the container.

2. A structure like that defined in claim 1, which also includes a weight mounted on said lever, said weight being located on the side of said palate opposite to said pivotal attachment, whereby the load of said palate on said seat is enhanced as gas pressure in the container grows larger from zero to a certain degree and thereafter as gas pressure in the container grows still larger, the load of said palate on said seat decreases until the said operating mechanism opens the palate to provide pressure relief for the container.

References Cited in the file of this patent
UNITED STATES PATENTS

| | | |
|---|---|---|
| 339,316 | Murphy | Apr. 6, 1886 |
| 369,528 | Kaiser | Sept. 6, 1887 |
| 1,731,815 | Day | Oct. 15, 1929 |
| 2,168,891 | Wiggins | Aug. 8, 1939 |
| 2,215,308 | Wiggins | Sept. 17, 1940 |
| 2,223,712 | Ziebolz | Dec. 3, 1940 |
| 2,295,767 | Wiggins | Sept. 15, 1942 |